July 20, 1965

L. F. SMITH

3,195,366

NUT AND SCREW DEVICE

Filed July 24, 1963

INVENTOR.
Lowell F. Smith
BY
A. M. Heiter
ATTORNEY

July 20, 1965   L. F. SMITH   3,195,366
NUT AND SCREW DEVICE
Filed July 24, 1963   2 Sheets-Sheet 2

Fig. 4

INVENTOR.
Lowell F. Smith
BY
ATTORNEY

United States Patent Office 3,195,366
Patented July 20, 1965

3,195,366
NUT AND SCREW DEVICE
Lowell F. Smith, Saginaw, Mich., assignor to General
Motors Corporation, Detroit, Mich., a corporation of
Delaware
Filed July 24, 1963, Ser. No. 297,257
22 Claims. (Cl. 74—424.8)

This invention relates to nut and screw mechanisms and more particularly to sequencing devices for nut and screw mechanisms having multiextending screws.

In a nut and screw mechanism of the type having a multiextending screw it has been found desirable that the operation of the mechanism be controlled to provide predetermined and exact sequential motions between its inner and outer nut and screw parts during extension and retraction and be capable of cushioning shock loading. In addition, it has been found desirable that the driven parts be prevented from jamming in their fully extended and retracted positions since such jamming inhibits these driven parts from backing off from their extreme positions. Furthermore, it is sometimes highly advantageous that the space envelope of the assembly be as small as possible for applications where space accommodations are limited. Also, it is desirable that the sequencing device used be simple in structure and easy to assemble.

This invention has features directed to such desirous attributes and in a preferred embodiment includes a sequencing device for a nut and screw mechanism having an inner screw part, an inner nut and outer screw part having its nut portion received on the inner screw part, and an outer nut part received on the outer screw portion of the inner nut and outer screw part. Inner nut and screw lock and locking means are provided which are operable to lock the inner nut and outer screw part and the inner screw part together for conjoint rotation in only one rotational direction with resulting axial movement of the outer nut part along the outer screw portion when the outer nut part is prevented from rotation and the inner screw part is rotated in the one direction. The inner nut and screw lock and locking means are operable to unlock the locked parts when the outer nut part reaches a predetermined point on the outer screw portion; and outer nut and screw compression stop means operably engaged by both the outer nut part and inner nut and outer screw part yieldingly prevent further relative rotation in one rotational direction and also jamming between the engaging parts which then conjointly travel in one axial direction along the inner screw part when the outer nut part is prevented from rotation and the inner screw part is rotated in the one rotational direction. Upon initial conjoint travel of the outer nut part and the inner nut and outer screw part in the one axial direction along the inner screw part, outer nut and screw lock and locking means operatively lock the inner nut and outer screw part to the outer nut part to prevent relative rotation therebetween only in the opposite rotational direction as these parts continue to travel conjointly in the one axial direction which corresponds to extension of the multiple screw. Additional compression stop means limit the travel of the inner nut and outer screw part to a predetermined distance along the inner screw part and prevent jamming between the inner nut and outer screw part and the inner screw part in the extreme extended position and the outer nut and screw compression stop means also remain active since the outer nut and screw lock and locking means permit relative rotation between the outer nut part and the inner nut and outer screw part in the opposite rotational direction.

Upon rotation of the inner screw part in the opposite rotational direction, the outer nut part and the inner nut and outer screw part conjointly retract in the opposite axial direction since the outer nut and screw lock and locking means prevent relative rotation between these parts in the opposite direction. These parts retract until the inner nut and outer screw part reaches a predetermined point on the inner screw part. Upon reaching the latter point, the outer nut and screw lock and locking means are operable to unlock the parts they lock; and inner nut and screw compression stop means operably engaged by both the inner nut and outer screw part and the inner screw part yieldingly prevent further relative rotation between these parts in the opposite rotational direction and also jamming between these engaging parts which then conjointly rotate in the opposite rotational direction. Upon initial conjoint rotation of the inner screw part and the inner nut and outer screw part, the inner nut and screw lock and locking means are operable to lock these parts together to condition the device for a subsequent extending stroke while the outer nut part retracts. Additional compression stop means on the inner nut and outer screw part limit the travel of the outer nut part in the opposite axial direction along the outer screw portion and prevent jamming between the outer nut part and the inner nut and outer screw part in the extreme retracted position of the outer nut part. Since the inner nut and screw lock and locking means permit rotation of the inner nut and outer screw part relative to the inner screw part in the opposite direction the inner nut and screw compression stop means remain active in the maximum retracted position of the inner nut and outer screw part on the inner screw part.

This arrangement thus provides when the inner screw part is rotated and the outer nut part is prevented from rotation predetermined and exact sequential motions between the relatively moving parts with the outer nut part first extending a predetermined distance along the outer screw portion whereafter the outer nut part and the inner nut and outer screw part conjointly extend a predetermined distance relative the inner screw part. Upon retraction, the outer nut part and the inner nut and outer screw part travel in the opposite direction along the inner screw part until the inner nut and outer screw part is fully retracted thence the outer nut part travels in the opposite direction along the inner nut and outer screw part to its fully retracted position. Jamming of the outer nut part on the inner nut and outer screw part and the latter part on the inner screw part is prevented by the compression stop means during the extending and retracting strokes of these parts and these stop means are arranged so that they retard the relative motions between the parts prior to the described sequential locking of the relatively movable parts. In addition, the sequencing device provides that the outer nut and screw compression stop means and the inner nut and screw compression stop means bear any shock loading in the maximum extended position of the nut and screw mechanism. In the maximum retracted position, the inner nut and screw compression stop means and the aforementioned compression stop means on the inner nut and outer screw part bear any shock loading on the nut and screw mechanism. The operating parts of the sequencing device are arranged so that they do not extend radially beyond the outer nut part and thus the space envelope of the assembly in this direction is maintained at a minimum. Also, since the outer nut part extends first and then the inner nut and outer screw part, the axial space occupied by the nut and screw mechanism does not increase until the final extending stroke in the sequential operation of the mechanism.

An object of this invention is to provide in a nut and screw mechanism having a multiextending screw, an improved and simplified sequencing device operative to effect a predetermined and exact sequence of strokes of the relatively movable parts.

Another object of this invention is to provide a sequencing device small in space envelope and improved and simplified in structure adapted to be assembled as a subassembly on a nut and screw mechanism having a multi-extending screw and which is operative to accurately control in a predetermined manner the sequential motions of the nut and screw parts.

Another object of this invention is to provide in a nut and screw mechanism having a multiextending screw a sequencing device operative to effect upon rotation of an inner screw, axial movement of an outer nut when held against rotation along an outer screw and, upon predetermined movement of the outer nut along the outer screw, locking of the outer screw to the outer nut to prevent relative rotation therebetween in one direction and permit relative rotation in the opposite direction and axial movement of the inner nut along the inner screw part when the inner screw part is rotated in the opposite direction.

Another object of this invention is to provide in a nut and screw mechanism having a multi-extending screw, a sequencing device operative to effect a predetermined and exact sequence of strokes of the axially movable nut and screw parts including means operative to retard relative rotation between the inner nut and screw and between the outer nut and screw and prevent jamming and cushion shock loading between these relatively movable parts and means operative to sequentially lock the inner nut and screw and the outer nut and screw subsequent to relative rotation being prevented between the relatively movable parts by the first mentioned means.

Another object of this invention is to provide in a nut and screw mechanism having a multiextending screw, a sequencing device operative through compression stop means to selectively prevent relative motion and jamming between the inner nut and screw and the outer nut and screw, and lock and locking means isolated from any shock loading operative to selectively lock the inner nut and screw together and the outer nut and screw together for conjoint rotation subsequent to predetermined operation of the compression stop means.

Another object of this invention is to provide in a nut and screw mechanism having a multiextending screw, a sequencing device operable to positively and sequentially lock the inner nut to the inner screw to prevent relative rotation therebetween in one direction, and sequentially prevent relative rotation in the opposite direction between the outer nut and the outer screw while the nut and screw parts are in nonjamming positions at predetermined lengths of travel of the outer nut on the outer screw and the inner nut on the inner screw respectively so that an exact sequence of strokes of the outer nut and outer screw relative to the inner screw is determined free of jamming between the relatively moving parts.

Another object of this invention is to provide a sequencing device for a nut and screw mechanism having a multi-extending screw operable in a first condition in response to predetermined travel of the inner nut and outer screw part on the inner screw part to lock the inner nut and outer screw part to the inner screw part for conjoint rotation in only one rotational direction and in a second condition operable in response to predetermined travel of the outer nut part on the inner nut and outer screw part to prevent relative rotation between the outer nut part and the inner nut and outer screw part in only one rotational direction.

These and other objects of the invention will be more apparent from the following description and drawings of the preferred embodiment.

Figures 1, 2, 3:
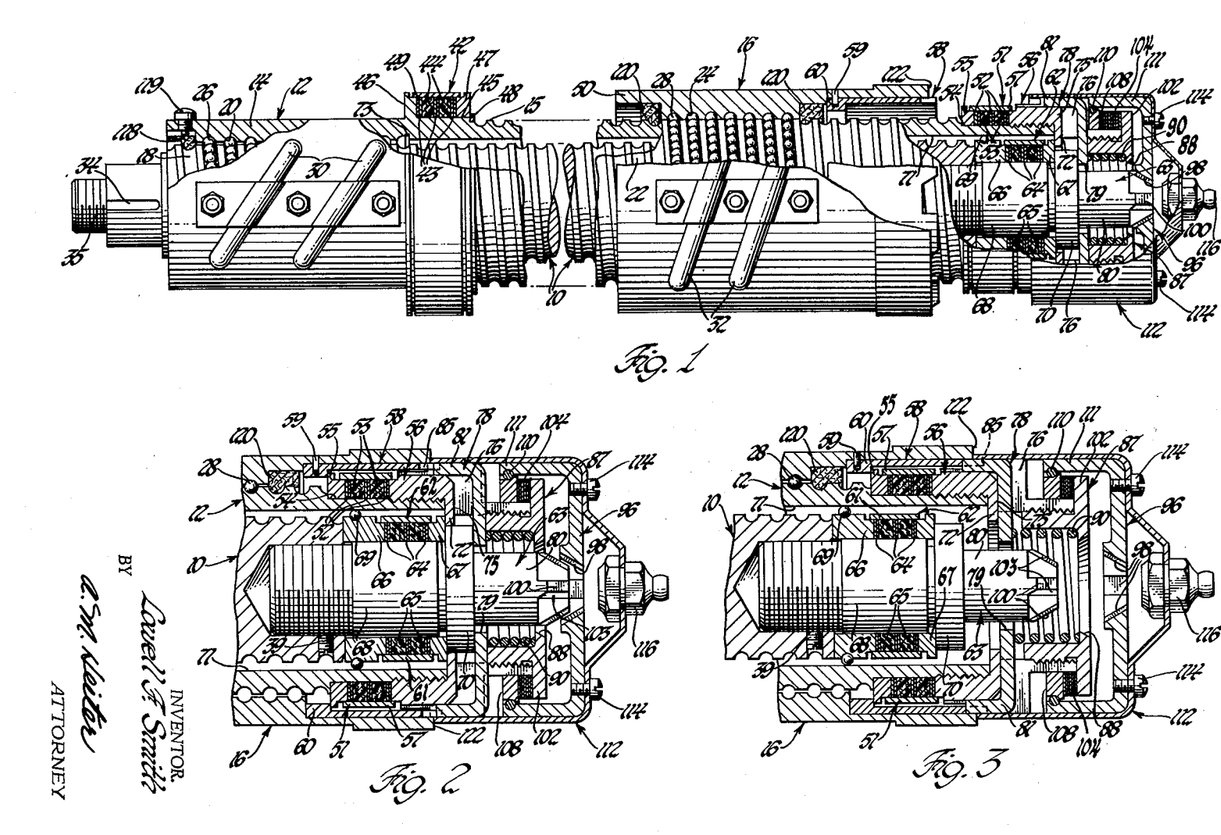
FIGURE 1 is a side view with parts broken away and parts in section of the preferred embodiment and illustrates one step in the operation of the sequencing device.
FIGURE 2 is an enlarged partial side view with parts broken away and parts in section and illustrates another step in the operation of the sequencing device.
FIGURE 3 is another enlarged partial side view with parts broken away and parts in section and illustrates another step in the operation of the sequencing device.
Figure 4:
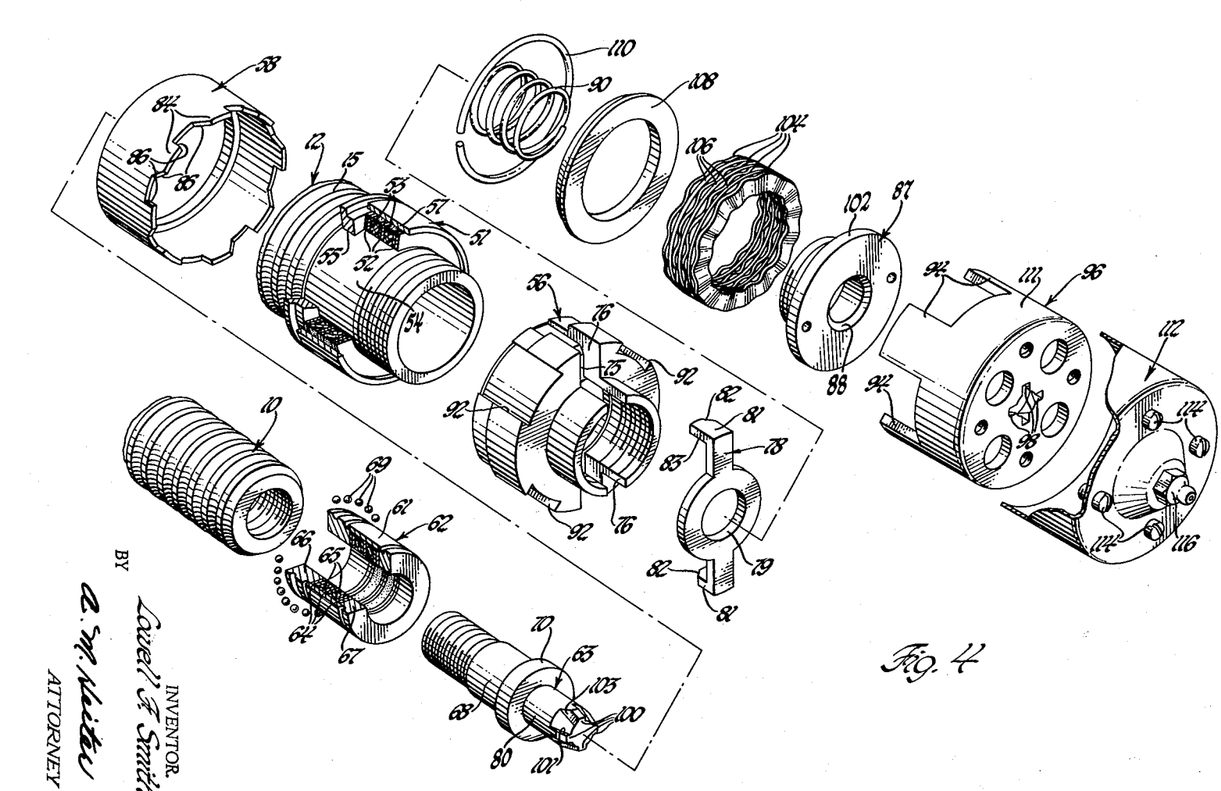
FIGURE 4 is an exploded view of the sequencing device.

The invention is illustrated in the double extend ball bearing screw assembly shown in FIGURE 1. The nut and screw assembly has an inner screw part 10, an inner nut and outer screw part 12 having integral inner nut and outer screw portions 14 and 15 respectively and an outer nut part 16. The inner screw part 10 and inner nut portion 14 have complementary helical ball grooves 18 and 20 respectively defining a first helical race or ball passageway and the outer screw portion 15 and outer nut part 16 also have complementary helical grooves 22 and 24 respectively defining a second helical race or ball passageway. Trains of balls 26 and trains of balls 28 are continuously loaded in the first and second races respectively and provide a driving connection between the inner screw part and the inner nut and outer screw part, and between the inner nut and outer screw part and the outer nut part when there is relative motion between these respective pairs of parts. Conventional ball return or transfer tubes 30 and 32 secured to inner nut portion 14 and outer nut part 16 respectively return the balls to the first and second races respectively and provide in cooperation with the races continuous ball passageways or circiuts.

As well understood in the art, if one of the inner screw part and inner nut and outer screw part is held against axial movement and is free to be rotated relative to the other, such other part will be caused to move linearly if restrained against rotary movement. Again in the case of the inner nut and outer screw part and the outer nut part, if one of these parts is held against axial movement and is free to be rotated relative to the other, such other of these parts will be caused to move linearly if restrained against rotary movement. In the particular application contemplated, the outer nut part is connected to the load and prevented from rotation and the inner screw part is held against axial movement and while connected to the inner nut and outer screw part is rotated relative to the outer nut part and is also rotated relative to the inner nut and outer screw part. The particular sequential movements contemplated in the preferred embodiment are fully explained below. The spline 34 and threaded portion 35 on the inner screw part 10 are for connecting the inner screw part to the driving means.

Compression stops preferably comprising alternately arranged pairs of metal slip rings or washers and compression stop rings constructed of alternate layers of rubber and cloth are used to retard and prevent relative rotation between selected parts of the nut and screw mechanism during extension and retraction of the multiextending screw and prevent jamming of the parts in their extreme extended and retracted positions. One compression stop 42 is mounted adjacent the left hand or inboard end of the outer screw portion 15 of inner nut and outer screw part 12 as viewed in FIGURE 1 and includes alternately arranged pairs of metal slip rings 43 and compression stop rings 44 retained in position on an unthreaded portion 45 of part 12 by a collar 46 integral with the part 12 and a metal stop washer 47 which abuts a snap ring 48. The stop 42 further includes a sleeve 49 closely fitted on the peripheries of the stop rings 44. Outer nut part 16 has an axially extending and overhanging projection 50 contactable with the stop washer 47 upon relative rotation between these parts in a direction to move outer nut part 16 toward the left or inboard end of the inner nut and outer screw part 12 and upon contact the stop washer 47 is movable by the outer nut part 16 to compress the stop rings 44 between the unthreaded portion 45 of part 12, collar 46 and sleeve 49. At a predetermined degree of compression of the stop rings the stop 42 is effective to yieldingly prevent further relative movement between parts 12 and 16 and thus determines the extreme inboard position of the outer nut part 16 relative to the inner nut and outer screw part 12. The outer nut part 16 is not in a jammed condition which might be the case if it contacted a fixed abutment on part 12 and the stop rings in cooperation with the slip rings permit relatively easy movement or extension of the outer nut part relative to the outer nut and screw part in the opposite or back off direction.

A second or outer nut and screw compression stop 51 is mounted on the opposite or outboard end of part 12 and includes alternately arranged pairs of metal slip rings 52 and compression stop rings 53 retained in position on a reduced diameter unthreaded portion 54 of the part 12 by a stop washer 55 received on the reduced diameter unthreaded portion 54 and a housing member 56 of the sequencing device threadably received and fixed on the right hand or outboard end of the part 12 as viewed in FIGURE 1. The stop washer 55 is prevented from axial movement to the left relative to the part 12 from the position shown in FIGURE 1 by the step of the reduced diameter portion 54. A sleeve 57 is closely fitted on the peripheries of the stop rings 53. An outer nut sleeve 58 received in a counterbore in the right hand end of the outer nut part 16 is fixed to the outer nut part such as by pin connections 59 and has a radially inwardly extending projection or abutment 60 contactable with the stop washer 55 upon relative rotation between the outer nut part 16 and the inner nut and outer screw part 12 in a direction to move the outer nut part toward the outboard end of the inner nut and outer screw part and upon contact of the projection 60 with the stop washer 55, the stop washer 55 is movable by the outer nut to a position compressing the stop rings 53. At a predetermined degree of compression of the stop rings the stop 51 yieldingly prevents further relative movement between the outer nut part 16 and the inner nut and outer screw part 12 at the outboard end of the outer screw portion 15. The stop 51 acts in a manner like stop 42 and permits the outer nut to back off from this limited outboard position.

A third or inner nut and screw compression stop 62 is mounted at the right hand or outboard end of the inner screw part 10 and is retained in position by a stud member 63 threadably received and fixed by a locking screw 39 in the right hand end of inner screw part 10. The stop 62 includes alternately arranged pairs of slip rings 64 and compression stop rings 65 mounted between an outboard bearing race 66 and a stop washer 67 and within a close fitting sleeve 61. Race 66, slip rings 64, stop rings 65, sleeve 61 and stop washer 67 are mounted on an unthreaded portion 68 of the stud 63 and the race 66 and stop washer 67 are in abutting relationship with the right hand end of inner screw part 10 and a land or abutment 70 on stud 63 respectively. Bearing race 66 has an annular groove receiving a plurality of balls 69 and these balls contact the reduced diameter unthreaded bore portion 71 of the inner nut and outer screw part 12 to maintain clearance between parts 10 and 12 and provide an antifriction support for part 12 on part 10. Housing member 56 which is fixed for rotation with part 12 has a radially inwardly extending projection or abutment 72 contactable with the stop washer 67 upon relative motion between the inner nut and outer screw part 12 and the inner screw part 10 in a direction to move part 12 toward the inboard end of the inner screw part 10. The stop washer 67 is movable by part 12 acting through the abutment 72 to a position compressing the stop rings 65 and upon their compression to a predetermined degree the stop 62 yieldingly prevents further relative movement between parts 10 and 12 in the retracting direction. Extension of part 12 in the outboard direction along part 10 is limited by a shoulder 73 at the left hand end of bore 71 in part 12 effective through contact with the race 66 to compress the stop rings 65 of stop 62. Stop 62 like stops 42 and 51 permit easy back off of part 12 from its limited inboard and outboard positions on part 10.

When the nut and screw mechanism is operated by rotating the inner screw part 10 and preventing the outer nut part 16 from rotation the outer nut part may extend first from its inboard stop position against stop 42 or the inner nut and outer screw part 12 may extend first from its inboard stop position on stop 62. Whether the outer nut part 16 extends first on the outer screw portion 15 or the inner nut and outer screw part 12 extends first on the inner screw part 10 depends mostly on the separating torque between the outer nut part 16 and stop 42 and the separating torque between the inner nut and outer screw part 12 and the stop 62. The one part with the least separating torque between it and its associated stop will extend first.

The sequencing device in this preferred embodiment restricts the travel to the outer nut part 16 first and the inner nut and outer screw part 12 second during extension. In the retracting stroke the inner nut and outer screw part 12 retracts first and then the outer nut part 16 retracts second. The sequencing device includes the housing 56 which has diametrically opposed radially and axially extending first guide slots 76 including outboard sides 75 guiding a locking pawl 78 having an aperture 79 through which the unthreaded portion 80 of stud 63 is free to pass. The slots 76 permit axial movement and prevent rotational movement of the pawl 78 relative to the inner nut and outer screw part 12. The pawl 78 has diametrically opposed and axially extending tongue portions 81 having ramp portions 82 and flat portions 83 for cooperating with the locks or ratchet teeth 84 in the end of outer nut sleeve 58 which have corresponding ramp portions 85 and flat portions 86 as will be described fully below.

An annular retainer 87 is threadably received and fixed in the outboard end of housing 56 and has a radially inwardly extending projection 88 through which the unthreaded portion 80 of stud 63 is free to pass and provides a fixed abutment fixed to the inner nut and outer screw part 12 for a compression spring 90 which abuts against projection 88 and urges the pawl 78 against either the stud abutment 70 as shown in FIGURES 1 and 2 or against the outboard sides 75 of slots 76 as shown in FIGURE 3. The housing 56 is also provided with circumferentially spaced, diametrically opposed and axially extending second guide slots or grooves 92 receiving the axially extending legs or tongues 94 of a locking cap 96. The cap 96 by means of the housing 56 and guide slots 92 rotates with the inner nut and outer screw part 12 and in addition is capable of axial movement relative to the inner nut and outer screw part 12. The cap 96 has tapered female splines 98 engageable with the tapered male splines 100 on the end of stud 63 to lock the inner nut and outer screw part 12 to the inner screw part 10 for conjoint rotation in one direction through engagement of flat portions 101 of the male splines 100 with the flat sided female splines 98 and ramp portions 103 provided on the male splines 100 are operative to permit rotation of part 12 relative to part 10 in a manner as will be subsequently described. The legs 94 of the cap 96 freely clear the radially outwardly extending projection or abutment 102 of the annular retainer 87 and compression wave springs 104 separated by spacer rings 106 are compressed between the abutment 102 and a collar 108 which abuts a snap ring 110 received in an internal annular groove in the main body 111 of the cap 96. Springs 104 act to urge the cap 96 to the left as viewed in FIGURE 1 to engage the female splines 98 on cap 96 with the male splines 100 on stud 63 to lock the inner nut and outer screw part 12 to the inner screw part 10 when the outer nut part 16 is not fully extended. A cover 112 secured to cap 96 by screws 114 encloses the sequencing mechanism to protect the parts from foreign elements and has a lube fitting 116 through which lubricant can be supplied to lubricate the parts. To prevent foreign elements from entering the working grooves of the inner nut portion 14 and the outer nut part 16 there is provided a wiper 118 which extends into helical groove 18 of the inner screw part 10 and is secured by a screw connection 119 to the inboard end of the inner nut portion 14 and a pair of wipers 120 secured to the opposite ends of the outer nut part 16 extending into the helical grooves 22 of the outer screw portion 15.

Describing now the operation, with the multiextending screw in the fully retracted position the inner nut and outer screw part 12 is locked to rotate with inner screw part 10 by the cap 96 which is fixed against rotation relative to part 12 by the guide slots 92 in housing 56 and has its flat sided female splines 98 engaged by the flat portions 101 of the male splines 100 on the stud 63 which is fixed to rotate with the inner screw part 10. With the helical grooves on the screws being right hand grooves such as are shown, upon counterclockwise rotation of the inner screw part 10 when viewed from the left end of FIGURE 1, the outer nut part 16 when prevented from rotation will travel axially along the outer screw portion 15 toward the right or the outer screw portion's outboard end. With continued rotation of the inner screw part 10 the outer nut part 16 continues to travel or extend along the outer screw portion 15 until the right hand end face 122 of the outer nut part 16 contacts the left hand end of cover 112 fixed to cap 96 and thereafter upon continued rotation of inner screw part 10, the outer nut part 16 moves the cap 96 against the force of wave springs 104 unlocking the cap spline 98 from the stud spline 100 as shown in FIGURE 2. This unlocks the inner nut and outer screw part 12 from the inner screw part 10 and the part 12 is then ready to extend when the outer nut part 16 acting through outer nut sleeve abutment 60 sufficiently compresses the stop 51. Upon continued counterclockwise rotation of the inner screw part 10 the stop 51 is effective to prevent further counterclockwise rotation of the inner nut and outer screw part 12 relative to the outer nut part 16 when part 16 is held and thus the inner nut and outer screw part 12 extends or travels along the inner screw part 10 toward the latter's outboard end. As parts 16 and 12 conjointly extend, the pawl 78 which has been urged against the stud abutment 70 by the spring 90 is permitted by the extension of the inner nut and outer screw part 12 on inner screw part 10 to have its tongue portions 81 enter the spaces between teeth 84 in the outer nut sleeve 58. The stop 51 however remains the active connection in connecting parts 12 and 16 during their conjoint extension. Upon continued counterclockwise rotation of the inner screw part 10 the inner nut and outer screw part 12 extends along the outer screw portion 15 to its maximum extended position which is determined by the shoulder 73 engaging the bearing race 66 associated with the stop 62. Any continued torque input to inner screw part 10 tends to further compress stop 62 and rotate inner nut and outer screw part 12 in the same direction as part 10 or counterclockwise. When part 12 is urged to be rotated counterclockwise relative to outer nut part 16, ramp portions 82 of pawl 78 are urged against and ride up the ramp portions 85 of teeth 84 in nut sleeve 58 thus permitting part 12 to rotate counterclockwise relative to part 16 and the stop 51 is further compressed. Since both stops 51 and 62 are active when the multiextending screw is fully extended, both these stops are effective to cushion any shock loading which may occur at full extension. The pawl 78 acting through its flat portions 83 also prevents outer nut part 16 from backing off from stop 51.

When the inner screw part 10 is rotated in the opposite or clockwise direction when viewed from the left end of FIGURE 1 the inner nut and outer screw part 12 will retract first since the inner nut and outer screw part is locked to the outer nut part 16 by the flat portions 83 of pawl 78 engaging the flat portions 86 of teeth 84 and cannot rotate clockwise relative to outer nut part 16 when the outer nut part 16 is held. The inner nut and outer screw part 12 retracts along the inner screw part 10 such as may be visualized in FIGURE 3 until the stud abutment 70 of the inner screw part 10 contacts the pawl 78 as may be visualized in FIGURE 2. Upon further rotation of the inner screw part 10 in the clockwise direction the tongue portions 81 leave the teeth 84. The outer nut part 16 is then ready to retract on the outer screw portion 15 when the abutment 70 contacts the stop washer 67 of the stop 62 and compresses the stop 62 to prevent further relative motion between the part 12 and the inner screw part 10. As the outer nut part 16 retracts the cap 96 which is biased by the springs 104 follows with the outer nut part 16 until its cap splines 98 engage with the stud splines 100. When the outer nut part is fully retracted on the outer screw portion 15, any continued torque input to inner screw part 10 tends to further compress stop 42 and rotate part 12 in the same direction as part 10 or clockwise. The ramp portions 103 on the stud splines 100 in response to this continued torque input act on the flatsided cap splines 98 to urge cap 96 to the right to permit relative movement between parts 12 and 10 and the stop 62 is further compressed. Thus, both stops 42 and 62 are active when the multiextending screw is fully retracted and effective to cushion any shock loading which may occur. The cap 96 acting through its flat sided female splines also prevents part 12 from backing off from stop 62.

The above-described preferred embodiment is illustrative of the invention and it is to be understood that it may be modified within the scope of the appended claims.

I claim:
1. In a nut and screw mechanism,
 (a) an inner means, intermediate means and outer means,
 (b) complementary helical grooves on said inner and intermediate means and on said intermediate and outer means defining separate ball passageways and a train of balls loaded in each passageway providing a driving connection between said inner and intermediate means and between said intermediate and outer means upon relative motion between said drivingly connected means,
 (c) first connecting means operable to selectively connect said intermediate means to said inner means to prevent said intermediate means from rotating relative to said inner means in one rotational direction while permitting said intermediate means to rotate relative to said inner means in the opposite rotational direction,
 (d) and second connecting means operable to selectively connect said intermediate means to said outer means to prevent said intermediate means from rotating relative to said outer means in said opposite rotational direction while permitting said intermediate means to rotate relative to said outer means in said one rotational direction.

2. In a nut and screw mechanism,
 (a) an inner means, intermediate means and outer means,
 (b) complementary helical grooves on said inner and intermediate means and on said intermediate and outer means defining separate ball passageways and a train of balls loaded in each passageway providing a driving connection between said inner and intermediate means and between said intermediate and outer means upon relative motion between said drivingly connected means,
 (c) first connecting means operable in a first condition to connect said intermediate means to said inner means to prevent said intermediate means from rotating relative to said inner means in one rotational direction while permitting said intermediate means to rotate relative to said inner means in the opposite rotational direction and in a second condition in response to predetermined travel of said outer means in one axial direction along said intermediate means to permit relative rotation between said intermediate means and inner means, (d) and second connecting means operable when said first connecting means is in said second condition to connect said intermediate means to said outer means to prevent said intermediate means from rotating relative to said outer means in said opposite rotational direction while permitting said intermediate means to rotate relative to said outer means in said one rotational direction.

3. In a nut and screw mechanism, (a) an inner means, intermediate means and outer means, (b) complementary helical grooves on said inner and intermediate means and on said intermediate and outer means defining separate ball passageways and a train of balls loaded in each passageway providing a driving connection between said inner and intermediate means and between said intermediate and outer means upon relative motion between said drivingly connected means, (c) first connecting means operable in a first condition to connect said intermediate means to said inner means to prevent said intermediate means from rotating relative to said inner means in one rotational direction while permitting said intermediate means to rotate relative to said inner means in the opposite rotational direction and in a second condition in response to predetermined travel of said outer means in one axial direction along said intermediate means to permit relative rotation between said intermediate means and inner means, (d) and second connecting means including pawl and ratchet means operable when said first connecting means is in said second condition to connect said intermediate means to said outer means to prevent said intermediate means from rotating relative to said outer means in said opposite rotational direction while permitting said intermediate means to rotate relative to said outer means in said one rotational direction and in response to predetermined travel of said intermediate means and prior to said first condition of said first connecting means permitting said intermediate means to rotate relative to said outer means in both rotational directions.

4. In a nut and screw mechanism, (a) an inner means, intermediate means and outer means, (b) complementary helical grooves on said inner and intermediate means and on said intermediate and outer means defining separate ball passageways and a train of balls loaded in each passageway providing a driving connection between said inner and intermediate means and between said intermediate and outer means upon relative motion between said drivingly connected means, (c) first connecting means including first spline means fixed for rotation with said intermediate means and second spline means fixed for rotation with said inner means operable in a first condition to connect said intermediate means to said inner means to prevent said intermediate means from rotating relative to said inner means in one rotational direction while permitting said intermediate means to rotate relative to said inner means in the opposite rotational direction and in a second condition in response to predetermined travel of said outer means in one axial direction along said intermedaite means to permit relative rotation between said intermediate means and inner means, (d) and second connecting means including ratchet means fixed for rotation with said outer means and pawl means fixed for rotation with said intermediate means operable when said first connecting means is in said second condition to connect said intermediate means to said outer means to prevent said intermediate means from rotating relative to said outer means in said opposite rotational direction while permitting said intermediate means to rotate relative to said outer means in said one rotational direction and in response to predetermined travel of said intermediate means and prior to said first condition of said first connecting means permitting said intermediate means to rotate relative to said outer means in both rotational directions.

5. In a nut and screw mechanism, (a) an inner means, intermediate means and outer means, (b) complementary helical grooves on said inner and intermediate means and on said intermediate and outer means defining separate ball passageways and a train of balls loaded in each passageway providing a driving connection between said inner and intermediate means and between said intermediate and outer means upon relative motion between said drivingly connected means, (c) first connecting means operable in a first condition to connect said intermediate means to said inner means for conjoint rotation in one rotational direction when said inner means is rotated in said one rotational direction and in a second condition in response to predetermined travel of said outer means in one axial direction along said intermediate means to permit relative rotation between said intermediate means and inner means, (d) second connecting means operable when said first connecting means is in said second condition to connect said intermediate means to said outer means to prevent said intermediate means from rotating relative to said outer means in the opposite rotational direction while permitting said intermediate means to rotate relative to said outer means in said one rotational direction and in response to predetermined travel of said intermediate means and prior to said first condition of said first connecting means permitting said intermediate means to rotate relative to said outer means in both rotational directions, (e) and compression stop means operable to limit travel of said outer means along said intermediate means by yieldingly preventing said intermediate means from rotation relative to said outer means in said one rotational direction.

6. The invention defined in claim 5 and said second connecting means including ratchet and pawl means.

7. In a nut and screw mechanism, (a) an inner means, intermediate means and outer means, (b) complementary helical grooves on said inner and intermediate means and on said intermediate and outer means defining separate ball passageways and a train of balls loaded in each passageway providing a driving connection between said inner and intermediate means and between said intermediate and outer means upon relative motion between said drivingly connected means, (c) first connecting means operable in a first condition to connect said intermediate means to said inner means to prevent said intermediate means from rotating relative to said inner means in one rotational direction and in a second condition in response to predetermined travel of said outer means in one axial direction along said intermediate means to permit relative rotation between said intermediate means and inner means, (d) second connecting means operable when said first connecting means is in said second condition to connect said intermediate means to said outer means to prevent said intermediate means from rotating relative to said outer means in the opposite rotational direction while permitting said intermediate means to rotate relative to said outer means in said one rotational direction and in response to predetermined travel of said intermediate means along said inner means in the opposite axial direction and prior to said first condition of said first connecting means permitting said intermediate means to rotate relative to said outer means in both rotational directions, (e) and compression stop means operable to limit travel of said intermediate means along said inner means by yieldingly preventing said intermediate means from rotation relative to said inner means in said opposite rotational direction after said predetermined travel of said intermediate means along said inner means.

8. In a nut and screw mechanism,
(a) an inner means, intermediate means and outer means,
(b) complementary helical grooves on said inner and intermediate means and on said intermediate and outer means defining separate ball passageways and a train of balls loaded in each passageway providing a driving connection between said inner and intermediate means and between said intermediate and outer means upon relative motion between said drivingly connected means,
(c) first connecting means operable in a first condition to connect said intermediate means to said inner means to prevent said intermediate means from rotating relative to said inner means in one rotational direction and in a second condition in response to predetermined travel of said outer means in one axial direction along said intermediate means to permit relative rotation between said intermediate means and inner means,
(d) first compression stop means operable to limit travel of said outer means along said intermediate means subsequent to said first condition of said first connecting means by yieldingly preventing said intermediate means from rotation relative to said outer means in said one rotational direction,
(e) second connecting means operable when said first connecting means is in said second condition to connect said intermediate means to said outer means to prevent said intermediate means from rotating relative to said outer means in the opposite rotational direction while permitting said intermediate means to rotate relative to said outer means in said one rotational direction and in response to predetermined travel of said intermediate means along said inner means in the opposite axial direction and prior to said first condition of said first connecting means permitting said intermediate means to rotate relative to said outer means in both rotational directions,
(f) and second compression stop means operable to limit travel of said intermediate means along said inner means prior to said first condition of said first connecting means by yieldingly preventing said intermediate means from rotation relative to said inner means in said opposite rotational direction.

9. In a nut and screw mechanism,
(a) an inner means, intermediate means and outer means,
(b) complementary helical grooves on said inner and intermediate means and on said intermediate and outer means defining separate ball passageways and a train of balls loaded in each passageway providing a driving connection between said inner and intermediate means and between said intermediate and outer means upon relative motion between said drivingly connected means,
(c) first connecting means operable in a first condition to connect said intermediate means to said inner means to prevent said intermediate means from rotating relative to said inner means in one rotational direction and in a second condition to permit relative rotation between said intermediate means and inner means,
(d) first compression stop means operable to yieldingly prevent rotation of said intermediate means relative to said outer means in said one rotational direction while said first contacting means is in said first condition,
(e) second connecting means operable when said first connecting means is in said second condition to connect said intermediate means to said outer means to prevent said intermediate means from rotating relative to said outer means in the opposite rotational direction,
(f) and second compression stop means operable to yieldingly prevent rotation of said intermediate means relative to said inner means in said one rotational direction while said second connecting means prevents said intermediate means from rotating relative to said outer means in said opposite rotational direction.

10. The invention defined in claim 9 and said second connecting means including ratchet means fixed for rotation with said outer means and pawl means fixed for rotation with said intermediate means.

11. In a nut and screw mechanism,
(a) inner means including inner screw means, intermediate means including inner nut and outer means and outer means including outer nut means,
(b) complementary helical grooves on said inner nut and screw means and on said outer nut and screw means defining separate ball passageways and a train of balls loaded in each passageway providing a driving connection between said inner and intermediate means and between said intermediate and outer means upon motion between said drivingly connected means,
(c) first connecting means operable in a normal first condition to lock said inner and intermediate means together for conjoint rotation in one rotational direction when said inner means is rotated in said one rotational direction whereby upon rotation of said inner means in said one rotational direction said outer means when prevented from rotation advances in one axial direction along said intermediate means,
(d) said first connecting means being operable in a second condition to unlock said intermediate means from said inner means whereby upon rotation of said inner means in said one rotational direction and in the opposite rotational direction, said intermediate and outer means when prevented from rotation conjointly advance and retract respectively along said inner means,
(e) first abutment means on said intermediate and outer means and first compression stop means contactable with and compressible by said first abutment means upon relative rotation between said intermediate and outer means and predetermined advancement of said outer means in said one axial direction along said intermediate means,
(f) said first compression stop means being operable when compressed to a predetermined degree by said first abutment means to yieldingly prevent further advancement of said outer means along said intermediate means whereafter upon continued rotation of said inner means in said one rotational direction said outer and intermediate means conjointly advance along said inner means,
(g) said outer means including first contacting means effective to change said first connecting means from its said first condition to its said second condition upon predetermined advancement of said outer means along said intermediate means,
(h) second connecting means operable in a normal first condition to permit relative rotation between said intermediate and outer means and in a second condition to lock said outer means to said intermediate means to prevent rotation of said intermediate means relative to said outer means in said opposite rotational direction while permitting rotational movement of said intermediate means relative to said outer means in said one direction, (i) second contacting means on said inner means effective to change said second connecting means from its said first condition to its said second condition upon predetermined advancement of said intermediate means along said inner means, (j) and third abutment means on said inner and intermediate means and second compression stop means contactable with and compressible by said third abutment means upon relative rotation between said inner and intermediate means and predetermined retraction of said intermediate means in the opposite axial direction along said inner means.

12. The invention defined in claim 11 and said first connecting means including spline means fixed for rotation with said inner means and intermediate means and said second connecting means including ratchet means fixed for rotation with said outer means and pawl means fixed for rotation with said intermediate means.

13. In an nut and screw mechanism,
  (a) inner means including inner screw means, intermediate means including inner nut and outer means and outer means including outer nut means,
  (b) complementary helical grooves on said inner nut and screw means and on said outer nut and screw means defining separate ball passageways and a train of balls loaded in each passageway providing a driving connection between said inner and intermediate means and between said intermediate and outer means upon motion between said drivingly connected means,
  (c) first lock means on said inner and intermediate means and first spring means,
  (d) first locking means rotatable with and capable of axial reciprocal movement on said intermediate means normally urged by said first spring means to a first position and operable in said first position to interconnect said first lock means to lock said inner and intermediate means together for conjoint rotation in one rotational direction when said inner means is rotated in said one rotational direction whereby upon rotation of said inner means in said one rotational direction, said outer means when prevented from rotation advances in one axial direction along said intermediate means,
  (e) said first locking means being operable when moved against the force of said first spring means to a second position to disconnect said first lock means whereby upon rotation of said inner means in said one rotational direction, said intermediate and outer means when prevented from rotation conjointly advance along said inner means,
  (f) first compression stop means operable to yieldingly limit advancement of said outer means beyond a predetermined position on said intermediate means whereafter upon continued rotation of said inner means in said one rotational direction said outer and intermediate means conjointly advance along said inner means when said outer means is prevented from rotation,
  (g) said outer means including first contacting means contactable with said first locking means and effective to move said first locking means from its said first position to its said second position against the force of said first spring means upon advancement of said outer means along said intermediate means and upon retraction of said outer means along said intermediate means to permit said first spring means to return said first locking means to its said first position,
  (h) said first contacting means of said outer means being arranged so that said first locking means is moved from its said first position to its said second position by said first contacting means prior to advancement of said outer means to its predetermined position on said intermediate means,
  (i) second contacting means on said inner means, second lock means on said outer and intermediate means and second spring means,
  (j) second locking means rotatable with and capable of axial reciprocal movement on said intermediate means urged by said second spring means to a first position to contact said second contacting means on said second means whereby said second locking means is prevented from interconnecting said second lock means and being urgeable to a second position by said second spring means and operable in said second position to interconnect said second lock means to lock said outer means to said intermediate means to prevent rotation of said intermediate means relative to said outer means in said opposite rotational direction while permitting rotational movement of said intermediate means relative to said outer means in said one direction,
  (k) said second contacting means on said inner means being arranged relative to said second locking means so that said second spring means is permitted by said second contacting means to urge said second locking means to its said second position subsequent to said first compression stop means reaching its said predetermined position on said intermediate means,
  (l) second compression stop means operable to yieldingly limit retraction of said intermediate means beyond a predetermined position on said inner means whereafter upon continued rotation of said inner means in said one direction said intermediate and outer means conjointly retract along said inner means,
  (m) and said second contacting means being arranged so that said second spring means is permitted to urge said second locking means to its first position prior to retraction of said intermediate means to its said predetermined position on said inner means.

14. In a nut and screw mechanism,
  (a) inner means including inner screw means, intermediate means including inner nut and outer means and outer means including outer nut means,
  (b) complementary helical grooves on said inner nut and screw means and on said outer nut and screw means defining separate ball passageways and a train of balls loaded in each passageway providing a driving connection between said inner and intermediate means and between said intermediate and outer means upon motion between said drivingly connected means,
  (c) first lock means on said inner and intermediate means and first spring means,
  (d) first locking means rotatable with and capable of axial reciprocal movement on said intermediate means normally urged by said first spring means to a first position and operable in said first position to interconnect said first lock means to lock said inner and intermediate means together for conjoint rotation in one rotational direction when said inner means is rotated in said one rotational direction whereby upon rotation of said inner means in said one rotational direction, said outer means when prevented from rotation advances in one axial direction along said intermediate means,
  (e) said first locking means being operable when moved against the force of said first spring means to a second position to disconnect said first lock means whereby upon rotation of said inner means in said one rotational direction, said intermediate and outer means when prevented from rotation conjointly advance along said inner means,
  (f) first abutment means on said intermediate and outer means and first compression stop means contactable with and compressible by said first abutment means upon relative rotation between said intermediate and outer means and predetermined advancement of said outer means in said one axial direction along said intermediate means,
- (g) said first compression stop means being operable when compressed to a predetermined degree by said first abutment means to yieldingly prevent further advancement of said outer means along said intermediate means whereafter upon continued rotation of said inner means in said one rotational direction said outer and intermediate means conjointly advance along said inner means when said outer means is prevented from rotation,
- (h) said outer means including first contacting means contactable with said first locking means and effective to move said first locking means from its said first position to its said second position against the force of said first spring means upon advancement of said outer means along said intermediate means and upon retraction of said outer means along said intermediate means to permit said first spring means to return said first locking means to its said first position,
- (i) second contacting means on said inner means, second lock means on said outer and intermediate means and second spring means,
- (j) second locking means rotatable with and capable of axial reciprocal movement on said intermediate means urged by said second spring means to a first position to contact said second contacting means on said second means whereby said second locking means is prevented from interconnecting said second lock means and being urgeable to a second position by said second spring means and operable in said second position to interconnect said second lock means to lock said outer means to said intermediate means to prevent rotation of said intermediate means relative to said outer means in the opposite rotational direction while permitting rotational movement of said intermediate means relative to said outer means in said one rotational direction,
- (k) and third abutment means on said inner and intermediate means and second abutment means contactable with and compressible by said third compression stop means upon relative rotation between said inner and intermediate means and predetermined retraction of said intermediate means in the opposite axial direction along said inner means.

15. The invention defined in claim 14 and said first lock means on said inner means and said first locking means including spline means and said second locking means including pawl means and said second lock means on said outer means including ratchet means.

16. The invention defined in claim 15 and both said first locking means and said first lock means on said inner means including spline means.

17. In a nut and screw mechanism,
- (a) inner means including inner screw means, intermediate means including inner nut and outer means and outer means including outer nut means,
- (b) complementary helical grooves on said inner nut and screw means and on said outer nut and screw means defining separate ball passageways and a train of balls loaded in each passageway providing a driving connection between said inner and intermediate means and between said intermediate and outer means upon motion between said drivingly connected means,
- (c) first lock means on said inner and intermediate means and first spring means,
- (d) first locking means on said intermediate means biased by said first spring means to a first position and operable in said first position to interconnect said first lock means to lock said inner and intermediate means together for conjoint rotation in one rotational direction when said inner means is rotated in said one rotational direction,
- (e) said first locking means being operable when moved against the force of said first spring means to a second position to disconnect said first lock means whereby upon rotation of said inner means in said one rotational direction, said intermediate and outer means when prevented from rotation conjointly advance in one axial direction along said inner means,
- (f) first abutment means on said intermediate and outer means and first compression stop means contactable with and compressible by said first abutment means upon relative rotation between said intermediate and outer means and predetermined advancement of said outer means in said one axial direction along said intermediate means,
- (g) said first compression stop means being operable when compressed to a predetermined degree by said first abutment means to yieldingly prevent further advancement of said outer means along said intermediate means,
- (h) said outer means including first contacting means contactable with said first locking means and effective to move said first locking means from its said first position to its said second position against the force of said first spring means upon advancement of said outer means along said intermediate means and upon retraction of said outer means along said intermediate means in the opposite axial direction to permit said first spring means to return said first locking means to its said first position,
- (i) second contacting means on said inner means, second lock means on said outer and intermediate means and second spring means,
- (j) second locking means on said intermediate means urged by said second spring means to a first position to contact said second contacting means on said second means whereby said second locking means is prevented from interconnecting said second lock means and being urgeable to a second position by said second spring means and operable in said second position to interconnect said second lock means to lock said outer means to said intermediate means to prevent rotation of said intermediate means relative to said outer means in the opposite rotational direction while permitting rotational movement of said intermediate means relative to said outer means in said one rotational direction,
- (k) and third abutment means on said inner and intermediate means and second compression stop means contactable with and compressible by said third abutment means upon relative rotation between said inner and intermediate means and predetermined retraction of said intermediate means in said opposite axial direction along said inner means.

18. In a nut and screw mechanism,
- (a) inner means including inner screw means, intermediate means including inner nut and outer means and outer means including outer nut means,
- (b) complementary helical grooves on said inner nut and screw means and on said outer nut and screw means defining separate ball passageways and a train of balls loaded in each passageway providing a driving connection between said inner and intermediate means and between said intermediate and outer means upon motion between said drivingly connected means,
- (c) first lock means on said inner and intermediate means and first spring means,
- (d) first locking means rotatable with and capable of axial reciprocal movement on said intermediate means normally urged by said first spring means to a first position and operable in said first position to interconnect said first lock means to lock said inner and intermediate means together for conjoint rotation in one rotational direction when said inner means is rotated in said one rotational direction whereby upon rotation of said inner means in said one rotational direction, said outer means when prevented from rotation advances in one axial direction along said intermediate means, (e) said first locking means being operable when moved against the force of said first spring means to a second position to disconnect said first lock means whereby upon rotation of said inner means in said one rotational direction, said intermediate and outer means when prevented from rotation conjointly advance along said inner means, (f) first abutment means on said intermediate and outer means and first compression stop means contactable with and compressible by said first abutment means upon relative rotation between said intermediate and outer means and predetermined advancement of said outer means in said one axial direction along said intermediate means, (g) said first compression stop means being operable when compressed to a predetermined degree by said first abutment means to yieldingly prevent further advancement of said outer means along said intermediate means whereafter upon continued rotation of said inner means in said one rotational direction said outer and intermediate means conjointly advance along said inner means, (h) said outer means including first contacting means contactable with said first locking means and effective to move said first locking means from its said first position to its said second position against the force of said first spring means upon advancement of said outer means along said intermediate means and upon retraction of said outer means along said intermediate means to permit said first spring means to return said first locking means to its said first position, (i) said first contacting means of said outer means being arranged relative to said first abutment means on said outer means so that said first locking means is moved from its said first position to its said second position by said first contacting means prior to compression of said first compression stop means by said first abutment means of said outer and intermediate means to said predetermined degree, (j) second contacting means on said inner means, second lock means on said outer and intermediate means and second spring means, (k) second locking means rotatable with and capable of axial reciprocal movement on said intermediate means urged by said second spring means to a first position to contact said second contacting means on said second means whereby said second locking means is prevented from interconnecting said second lock means and being urgeable to a second position by said second spring means and operable in said second position to interconnect said second lock means to lock said outer means to said intermediate means to prevent rotation of said intermediate means relative to said outer means in the opposite rotational direction while permitting rotational movement of said intermediate means relative to said outer means in said one rotational direction, (l) said second contacting means on said inner means being arranged relative to said second locking means so that said second spring means is permitted by said second contacting means to urge said second locking means to its said second position subsequent to compression of said first compression stop means by said first abutment means to said predetermined degree, (m) third abutment means on said inner and intermediate means and second compression stop means contactable with and compressible by said third abutment means upon relative rotation between said inner and intermediate means and predetermined retraction of said intermediate means in the opposite axial direction along said inner means, (n) and said third abutment means on said inner means being arranged relative to said second contacting means so that said second contacting means permits said second spring means to urge said second locking means to its first position prior to compression of said second compression stop means by said third abutment means to said predetermined degree.

19. In a nut and screw mechanism,
(a) an inner means, intermediate means and outer means,
(b) first thread means operatively connecting said intermediate means to said inner means to provide relative axial movement in response to relative rotary movement between said intermediate means and said inner means,
(c) second thread means operatively connecting said outer means to said intermediate means to provide relative axial movement in response to relative rotary movement between said outer means and said intermediate means,
(d) first connecting means operable to selectively connect said intermediate means to said inner means to prevent said intermediate means from rotating relative to said inner means in one rotational direction while permitting said intermediate means to rotate relative to said inner means in the opposite rotational direction,
(e) and second connecting means operable to selectively connect said intermediate means to said outer means to prevent said intermediate means from rotating relative to said outer means in said opposite rotational direction while permitting said intermediate means to rotate relative to said outer means in said one rotational direction.

20. In a nut and screw mechanism,
(a) an inner means, intermediate means and outer means,
(b) first thread means operatively connecting said intermediate means to said inner means to provide relative axial movement in response to relative rotary movement between said intermediate means and said inner means,
(c) second thread means operatively connecting said outer means to said intermediate means to provide relative axial movement in response to relative rotary movement between said outer means and said intermediate means,
(d) first connecting means operable in a first condition to connect said intermediate means to said inner means to prevent said intermediate means from rotating relative to said inner means in one rotational direction while permitting said intermediate means to rotate relative to said inner means in the opposite rotational direction and in a second condition in response to predetermined travel of said outer means in one axial direction along said intermediate means to permit relative rotation between said intermediate means and inner means,
(e) and second connecting means including pawl and ratchet means operable when said first connecting means is in said second condition to connect said intermediate means to said outer means to prevent said intermediate means from rotating relative to said outer means in said opposite rotational direction while permitting said intermediate means to rotate relative to said outer means in said one rotational direction and in response to predetermined travel of said intermediate means and prior to said first condition of said first connecting means permitting said intermediate means to rotate relative to said outer means in both rotational directions.

21. In a nut and screw mechanism,
(a) an inner means, intermediate means and outer means,
(b) first thread means operatively connecting said intermediate means to said inner means to provide relative axial movement in response to relative rotary movement between said intermediate means and said inner means,
(c) second thread means operatively connecting said outer means to said intermediate means to provide relative axial movement in response to relative rotary movement between said outer means and said intermediate means,
(d) first connecting means operable in a first condition to connect said intermediate means to said inner means for conjoint rotation in one rotational direction when said inner means is rotated in said one rotational direction and in a second condition in response to predetermined travel of said outer means in one axial direction along said intermediate means to permit relative rotation between said intermediate means and inner means,
(e) second connecting means operable when said first connecting means is in said second condition to connect said intermediate means to said outer means to prevent said intermediate means from rotating relative to said outer means in the opposite rotational direction while permitting said intermediate means to rotate relative to said outer means in said one rotational direction and in response to predetermined travel of said intermediate means and prior to said first condition of said first connecting means permitting said intermediate means to rotate relative to said outer means in both rotational directions,
(f) and compression stop means operable to limit travel of said outer means along said intermediate means by yieldingly preventing said intermediate means from rotation relative to said outer means in said one rotational direction.

22. In a nut and screw mechanism,
(a) an inner means, intermediate means and outer means,
(b) first thread means operatively connecting said intermediate means to said inner means to provide relative axial movement in response to relative rotary movement between said intermediate means and said inner means,
(c) second thread means operatively connecting said outer means to said intermediate means to provide relative axial movement in response to relative rotary movement between said outer means and said intermediate means,
(d) first connecting means operable in a first condition to connect said intermediate means to said inner means to prevent said intermediate means from rotating relative to said inner means in one rotational direction and in a second condition to permit relative rotation between said intermediate means and inner means,
(e) first compression stop means operable to yieldingly prevent rotation of said intermediate means relative to said outer means in said one rotational direction while said first contacting means is in said first condition,
(f) second connecting means operable when said first connecting means is in said second condition to connect said intermediate means to said outer means to prevent said intermediate means from rotating relative to said outer means in the opposite rotational direction,
(g) and second compression stop means operable to yieldingly prevent rotation of said intermediate means relative to said inner means in said one rotational direction while said second connecting means prevents said intermediate means from rotating relative to said outer means in said opposite rotational direction.

References Cited by the Examiner
UNITED STATES PATENTS
2,791,128  5/57  Geyer et al. __________ 74—424.8
2,946,235  7/60  Musser _______________ 7—424.8

DON A. WAITE, *Primary Examiner.*